(12) United States Patent
Talagadadeevi et al.

(10) Patent No.: US 9,742,700 B2
(45) Date of Patent: Aug. 22, 2017

(54) METHOD AND APPARATUS FOR ENABLING COMMUNICATIONS AND FEATURES IN STORAGE AREA NETWORKS

(71) Applicant: Cisco Technology, Inc., San Jose, CA (US)

(72) Inventors: Venkata Talagadadeevi, Cupertino, CA (US); Srinivas Pitta, Cupertino, CA (US); Lavanya Apsani, Hyderabad (IN); Kishan Kumar Kotari Uppunda, Bangalore (IN)

(73) Assignee: Cisco Technology, Inc., San Jose, CA (US)

(*) Notice: Subject to any disclaimer, the term of this patent is extended or adjusted under 35 U.S.C. 154(b) by 132 days.

(21) Appl. No.: 14/864,062

(22) Filed: Sep. 24, 2015

(65) Prior Publication Data
US 2017/0041250 A1    Feb. 9, 2017

(30) Foreign Application Priority Data
Aug. 5, 2015  (IN) .......................... 4073/CHE/2015

(51) Int. Cl.
*H04L 12/937* (2013.01)
*H04W 76/02* (2009.01)

(52) U.S. Cl.
CPC .................. *H04L 49/253* (2013.01)

(58) Field of Classification Search
CPC .................. H04L 49/253; H04W 76/021
See application file for complete search history.

(56) References Cited

U.S. PATENT DOCUMENTS 8,953,617 B2    2/2015  Nguyen et al.
2007/0002767 A1*  1/2007  Holman .............. H04L 41/0893
                                              370/255

(Continued)

OTHER PUBLICATIONS

Wikipedia, Organizationally Unique Identifier (2015) Can be seen at: https://en.wikipedia.org/wiki/Organizationally_unique_indentifier.

*Primary Examiner* — Charles C Jiang
*Assistant Examiner* — Thad Defauw
(74) *Attorney, Agent, or Firm* — Samuel M. Katz (57) ABSTRACT

In one embodiment, a method for enabling communication between two network fiber channel (FC) switches, includes: receiving at least one protocol frame at a first network FC switch, the at least one protocol frame being received from a second network FC switch connected to the first network FC switch and comprising information related to a manufacturer of the second network FC switch; retrieving a first identifier of the second network FC switch from the at least one protocol frame, the first identifier comprising primary manufacturer information identifying a manufacturer of the second network FC switch; determining that the retrieved first identifier does not match one of a plurality of peer switch manufacturer identifiers stored in a memory of the first network FC switch, each of the plurality of peer switch manufacturer identifiers identifying peer switches for which one or more features may be enabled for communicating with the first network FC switch; retrieving a second identifier of the second network FC switch from the at least one protocol frame when the retrieved first identifier does not match one of the plurality of peer switch manufacturer identifiers, the second identifier comprising secondary manufacturer information identifying the manufacturer of the second network FC switch; and upon determining that the retrieved second identifier matches one of the plurality of (Continued)

peer switch manufacturer identifiers, updating the plurality of peer switch manufacturer identifiers stored in memory of the first network FC switch to include the retrieved first identifier; and enabling at least one of the one or more features for the first network FC switch to communicate with the second network FC switch.

20 Claims, 5 Drawing Sheets

(56) References Cited

U.S. PATENT DOCUMENTS

| | | | | |
|---|---|---|---|---|
| 2007/0234130 A1* | 10/2007 | Sullivan | ............... | G06F 11/006 714/43 |
| 2010/0103939 A1* | 4/2010 | Carlson | ............... | H04L 49/357 370/395.53 |
| 2011/0200330 A1* | 8/2011 | Sasso | ............... | H04L 67/1097 398/45 |
| 2013/0031350 A1* | 1/2013 | Thielen | ............... | G06F 9/4411 713/100 |
| 2013/0346629 A1* | 12/2013 | Wang | ............... | H04L 61/2532 709/245 |
| 2015/0244586 A1* | 8/2015 | Lee | ............... | H04L 12/6418 709/223 |

\* cited by examiner

METHOD AND APPARATUS FOR ENABLING COMMUNICATIONS AND FEATURES IN STORAGE AREA NETWORKS

TECHNICAL FIELD

The present disclosure relates generally to communications between fiber channel switches in storage area networks.

BACKGROUND

In storage area networks, certain communications and features may be enabled only between fiber channel (FC) switches belonging to a same or a certified manufacturer. Upon connection, two FC switches run a FC protocol for communicating between each other over a physical link. FC protocol frames are exchanged thereby allowing each FC switch to identify the other FC switch and know which features and/or functionalities may be enabled for communicating.

Each FC switch typically identifies a peer switch by checking an identifier retrieved from the exchanged FC protocol frames. However, under certain circumstances, although the peer switch has a valid identifier, the FC switch may not be able to recognize the peer switch. As a result, some features may not be enabled or communications between the FC switches may simply not be allowed.

BRIEF DESCRIPTION OF THE DRAWINGS

The present invention will be understood and appreciated more fully from the following detailed description, taken in conjunction with the drawings in which.

DESCRIPTION OF EXAMPLE EMBODIMENTS

Overview

In one embodiment, a method for enabling communication between two network fiber channel (FC) switches, includes: receiving at least one protocol frame at a first network FC switch, the at least one protocol frame being received from a second network FC switch connected to the first network FC switch and comprising information related to a manufacturer of the second network FC switch; retrieving a first identifier of the second network FC switch from the at least one protocol frame, the first identifier comprising primary manufacturer information identifying a manufacturer of the second network FC switch; determining that the retrieved first identifier does not match one of a plurality of peer switch manufacturer identifiers stored in a memory of the first network FC switch, each of the plurality of peer switch manufacturer identifiers identifying peer switches for which one or more features may be enabled for communicating with the first network FC switch; retrieving a second identifier of the second network FC switch from the at least one protocol frame when the retrieved first identifier does not match one of the plurality of peer switch manufacturer identifiers, the second identifier comprising secondary manufacturer information identifying the manufacturer of the second network FC switch; and upon determining that the retrieved second identifier matches one of the plurality of peer switch manufacturer identifiers, updating the plurality of peer switch manufacturer identifiers stored in memory of the first network FC switch to include the retrieved first identifier; and enabling at least one of the one or more features for the first network FC switch to communicate with the second network FC switch.

DETAILED DESCRIPTION OF EXEMPLARY EMBODIMENTS

In the following description, numerous specific details are set forth in order to provide a thorough understanding of the various principles of the present invention. However, those skilled in the art will appreciate that not all these details are necessarily always required for practicing the present invention. In this instance, well-known circuits, control logic, and the details of computer program instructions for conventional algorithms and processes have not been shown in detail in order not to obscure the general concepts unnecessarily.

Furthermore, although the principles of the present invention are largely described herein in relation to storage area networks and fiber channel switches, this is an example selected for convenience of presentation, and is not limiting. The present invention, in embodiments thereof, may be implemented in any other suitable networking environment such as, for example, but not limited to, local area networks when fiber channel over Ethernet is supported, etc.

Figure 1:
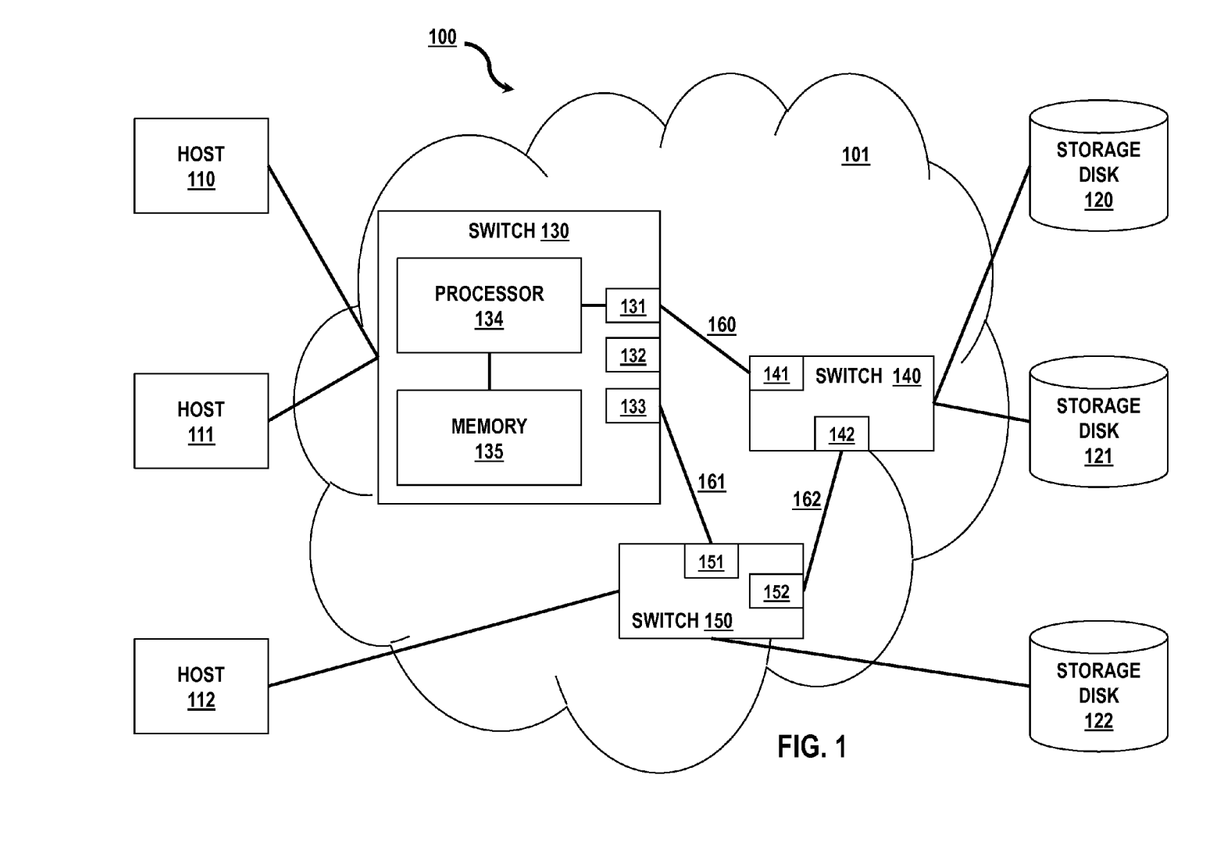
FIG. 1 is a simplified block diagram illustration of a storage area network (SAN) 100, constructed and operative in accordance with an embodiment of the present invention.

Reference is now made to FIG. 1, which is a simplified block diagram illustration of a storage area network (SAN) 100, constructed and operative in accordance with an embodiment of the present invention. FIG. 1 illustrates a storage area network 100 including a storage area network fabric 101 and associated end nodes. The nodes may include hosts 110, 111 and 112 as well as storage disks 120, 121 and 122. The hosts may be servers or other computers requiring access to the data on the disks. Fabric 101 is comprised of switches 130, 140 and 150 coupled by links 160, 161 and 162. These switches, hereinafter referred as Fiber Channel (FC) switches, run a storage area network protocol such as Fibre Channel, which provides communication between the nodes via Fibre Channel frames.

As depicted on FIG. 1, FC switch 130 comprises a plurality of ports 131, 132 and 133, at least one processor 134 and at least one memory 135. Although not depicted in FIG. 1, those skilled in the art will appreciated that FC switches 140 and 150 may comprise the same or similar components. FC switches 130, 140 and 150 may be any appropriate FC switch such as for example, but not limited to, a FC switch from Cisco Nexus 5000 series, Cisco Nexus 7000 series, Cisco MDS (Multilayer Director Switch) series, etc.

In the example of FIG. 1, a physical link 160 connecting port 131 of FC switch 130 to port 141 of FC switch 140 is shown. Upon connection, these two FC switches run a FC protocol for communicating between each other over the physical link 160. FC Protocol frames are exchanged between FC switches 130 and 140 thereby allowing each FC switch to identify the other FC switch and know which features and/or functionalities may be enabled on each FC switch for communicating.

In one example, FC switch 130 receives protocol frames from FC switch 140 and therefore obtains information associated with FC switch 140. Typical protocol frames are composed of a starting delimiter (SOF), a header, a payload, a Cyclic Redundancy Check (CRC), and an ending delimiter (EOF). Information associated with FC switch 140 is provided within the payload and comprises manufacturer information identifying the vendor or manufacturer of FC switch 140 such as, for example, but not limited to, an alphanumeric code or a character string representative of the company name of the manufacturer/vendor.

Processor 134 of FC switch 130 is then able to retrieve a first or primary identifier of FC switch 140 from the received manufacturer information. The first identifier may be for example, but not limited to, an Organizationally Unique Identifier (OUI) extracted from the World Wide Name (WWN), the WWN being received as part of the information associated with FC switch 140. Then, the processor 134 is further operative to compare the first identifier to a list of peer switch identifiers stored in memory 135. This list is a static list loaded at manufacture time and typically comprises a plurality of switch identifiers belonging to a particular manufacturer. Continuing with the example given hereinabove, the list may at least comprise some or all the OUIs purchased from the IEEE (Institute of Electrical and Electronics Engineers) and assigned to a particular manufacturer.

If the first identifier is not found in the list stored in memory 135, it typically means that the FC switch 140 does not belong to the same manufacturer or to an approved manufacturer. However, it could also mean that the FC switch 140 belongs to the same manufacturer but has a newly purchased and assigned OUI. For example, the FC switch 140 was deployed into the field and connected to the SAN 100 at a later time than the other network devices. Since the static list in memory 135 of FC switch 130 was loaded at manufacture time, the newly purchased and assigned OUI of FC switch 140 was not known and therefore, is not present in the list. In such a situation, the processor 134 is further operative to retrieve a second or secondary identifier of FC switch 140 from the received manufacturer information. The second identifier may be for example, but not limited to, a character string representing the company name of the manufacturer of FC switch 140. Processor 134 is therefore operative to compare the retrieved second identifier to the list of peer switch identifiers stored in memory 135. Those skilled in the art will appreciate that although described as being compared to a same list of peer switch identifiers, the first and second retrieved identifiers may be compared to two or more separate lists of peer switch identifiers stored in memory 135. Taking again the examples given hereinabove, the first list may comprise the OUIs assigned to a particular manufacturer and the second list may comprise company names of the particular manufacturer, including subsidiaries, affiliates and/or other approved company names.

In a situation where the second identifier is found in the list of peer switch identifiers, the processor 134 determines that FC switches 130 and 140 belongs to a same and/or an approved manufacturer and, as a result, certain features may be enabled for communication between the two FC switches. For example, F-port trunking and/or F-port channeling features may be enabled between two Cisco switches and/or between a Cisco switch and an Andiamo switch after finding the second identifier in the list of peer switch identifiers. In a situation where the first and second identifiers are not found in the list of peer switch identifiers, the F-port trunking and/or F-port channeling features are not enabled and basic communication may be enabled between the two FC switches.

As indicated above, the processor 134 is configured to access the list(s) stored in memory 135. Processor 134 is further configured to update or modify the list(s) stored in memory 135. When the second identifier is found in the list of peer switch identifiers, the processor 134 updates the list by adding the first identifier to the peer switch identifiers. For example, the OUI of FC switch 140 (retrieved as the first identifier) may be added to the list of peer switch identifiers when the processor 134 has determined that the character string representing the company name of the manufacturer of FC switch 140 (retrieved as the second identifier) corresponds to the manufacturer of FC switch 130 and/or to a manufacturer approved by FC switch 130.

Updating the list of peer switch identifiers typically enable other applications to be run on the FC switch 130. Non-limiting examples of applications making use of the OUI comprises: Fabric Configuration Server (FCS) typically using the OUI to support inter-virtual SAN routing feature (IVR); Network Processor Module (NPM) making use of the OUI to check the identify of an upstream switch; port security; FC name server; Fabric binding; F-port trunking; F-port channeling; etc.

Figure 2:
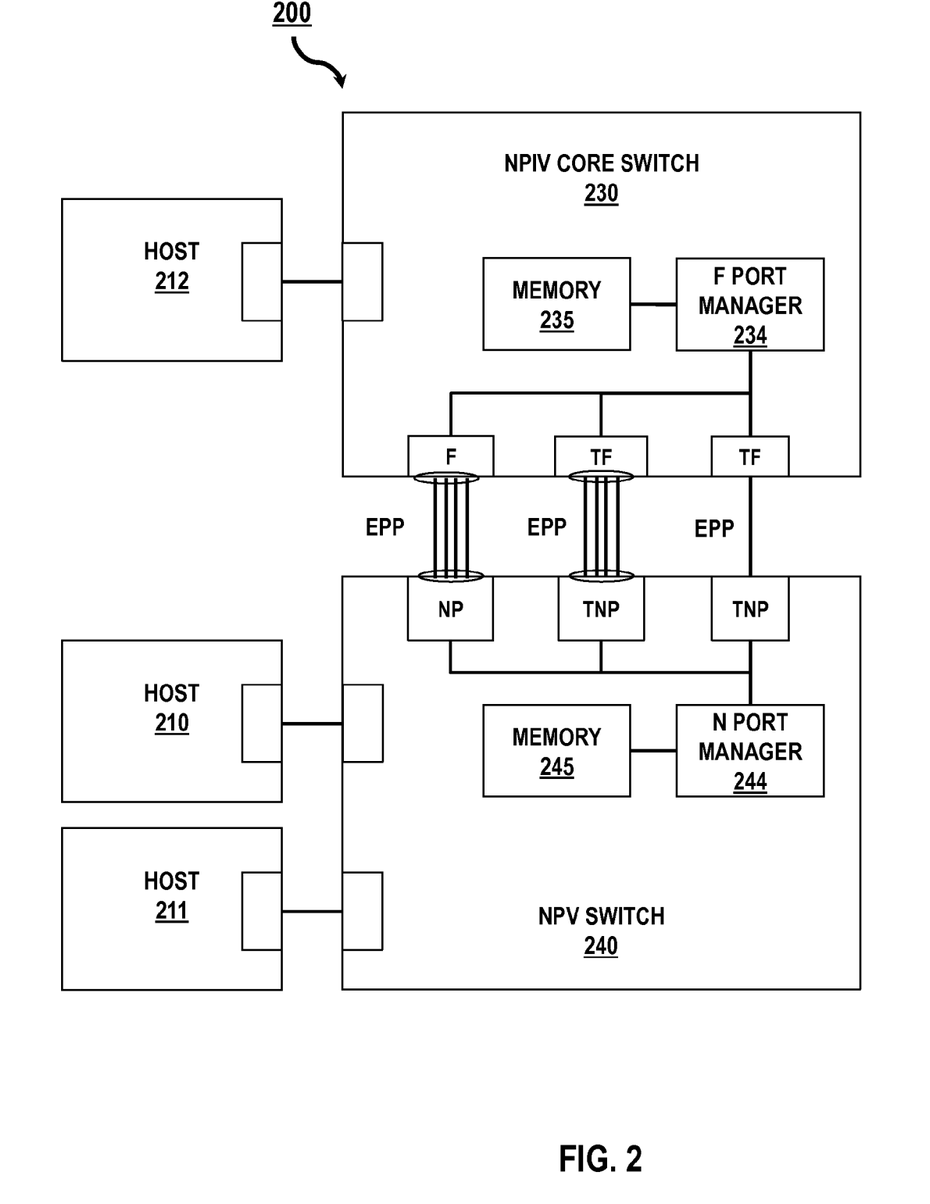
FIG. 2 is a simplified block diagram illustration of a storage area network 200, constructed and operative in accordance with another embodiment of the present invention.

Reference is now made to FIG. 2, which is a simplified block diagram illustration of a storage area network 200, constructed and operative in accordance with another embodiment of the present invention.

FIG. 2 shows a SAN 200 similar to the one shown in FIG. 1 although those skilled in the art will appreciate that not all the components of FIG. 1 have been depicted. FIG. 2 depicts three FC switches 230, 240 and 250 as well as three host devices 210, 211 and 212. In this example, FC switch 240 is set into Node Port Virtualization (NPV) mode and FC core switch 230 is set into Node Port ID Virtualization (NPIV) mode. Generally, conventional FC networks are deployed with a large number of FC switches connected to core devices. As the number of ports in the fabric increases, the number of switches also increases, which can result in an increase in the number of domains. Node Port Virtualization (NPV) addresses the increase in the number of domain IDs needed to deploy a large number of ports by making a fabric switch appear as a host to a core FC switch and as a FC switch to hosts in the fabric. A core FC switch allocates an FC address, referred to as a Fibre Channel Identifier (FCID), to each host and storage disk. NPIV allows for the assignment of multiple FCIDs to a single node port on the FC fabric. NPV makes use of NPIV to have multiple FCIDs allocated from the core switch on a node port Proxy (NP_Port) at the NPV device. Therefore, in the example shown in FIG. 2, the NPV switch 240 behaves as a host device connected to the NPIV core switch 230. FIG. 2 also depicts three ports on the NPIV core switch 230: one fabric port (F_port) and two trunking fabric ports (TF_ports). The F_port is connected to the NPV switch via a node port proxy (NP port) and each TF_port is connected via a trunking NP_port (TNP).

In such a configuration, the NPV switch 240 performs a fabric login (FLOGI) request with an extension page attached to the FLOGI protocol frame in order to enable the F-port trunking and channeling features. F-port trunking feature typically allows interconnected ports to transmit and receive frames on more than one VSAN over the same physical link. F-port channeling feature typically allows multiple ports to be combined into a port channel that increases the aggregate bandwidth on an inter-switch link (ISL); load balance traffic across multiple links and maintains optimum bandwidth utilization; and provides high availability on an ISL. The FLOGI protocol frame is a FC frame with a payload comprising a plurality of data fields such as, for example, a LS Command Code, Common Service Parameters, N_Port Name, Node Name or Fabric Name, Vendor Version level, Login Extension Data, etc. The FLOGI frame is received at the NPIV switch 230 and the F-port manager 234 may then retrieve the first and second identifiers identifying the manufacturer/vendor of the NPV switch 240. The first identifier (e.g. the OUI) is extracted by the F-port manager 234 from the WWN present in the N_Port Name field and/or the Node Name field of the FLOGI frame.

In a situation where the F-port manager 234 does not found a match for the first identifier in a list of peer switch identifiers stored in memory 235, a second identifier may be retrieved from the FLOGI frame. The second identifier (e.g. vendor string) is retrieved by the F-port manager 234 from the Login Extension Data field provided as part of the FLOGI frame. The Login Extension Data field typically comprises a vendor ID field populated with a character string representing the company name of the NPV switch 240 manufacturer/vendor (e.g. 'Cisco'). The list of peer switch identifiers may then be searched and if a match is found for the second identifier, the F-port manager 234 determines that the NPV switch 240 is a peer switch belonging to the same and/or an approved manufacturer.

As a result, the list of peer switch identifiers stored in memory 235 is updated to include the first identifier (e.g. the OUI of the NPV switch 240) retrieved from the FLOGI protocol frame. Also, the NPIV switch 230 sends back to the NPV switch 240 a notification indicating that the FLOGI request is accepted. The notification may be, for example, but not limited to, a FLOGI link services acceptance (LS_ACC) comprising the same fields as the FLOGI protocol frame.

Upon reception of the notification, the N-port manager 244 of NPV switch 240 is configured to perform the same operations as the ones performed by F-port manager 244 of the NPIV switch 230 after receiving the FLOGI request. Typically, a first identifier (e.g. OUI) identifying the NPIV switch 230 may be retrieved by the N-port manager 244 from the FLOGI LS_ACC frame using the Node Name field. If this identifier is not found in a list of peer switch identifier stored in a memory 245 of the NPV switch 240, a second identifier (e.g. character string representing the company name of the NPIV switch 230 manufacturer/vendor) may be retrieved by the N-port manager 244 from the vendor ID field present in the Login Extension Data field. If the second identifier is found in the list of peer switch identifiers, the list of peer switch identifiers stored in memory 245 is updated to include the first identifier to the list.

Thereafter, the F-port trunking feature may be enabled between the TF_ports of NPIV switch 230 and the TNP_ports of the NPV switch 240 and/or the F-port channeling feature may be enabled between the F_port of NPIV switch 230 and the NP_port of NPV switch 240. Also, since the first identifier (e.g. OUI) has been added to the list of peer identifiers, other applications running on the two FC switches 230 and 240 and making use of the first identifier may be enabled.

Figure 3:
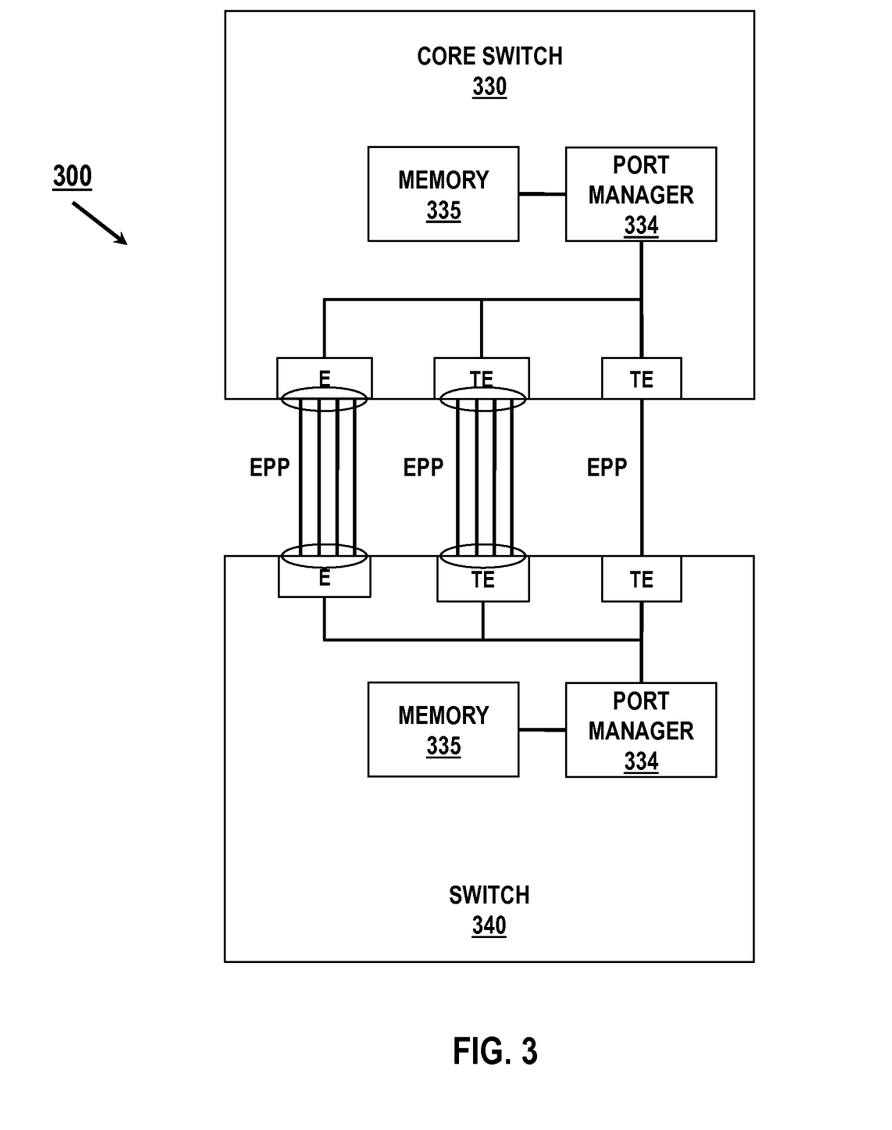
FIG. 3 is a simplified block diagram illustration of a storage area network 300, constructed and operative in accordance with still another embodiment of the present invention.

Reference is now made to FIG. 3, which is a simplified block diagram illustration of a storage area network 300, constructed and operative in accordance with another embodiment of the present invention.

FIG. 3 shows a SAN 300 similar to the ones shown in FIG. 1 and FIG. 2. For sake of the simplicity of depiction, only two FC switches are shown while the other devices (e.g. host and storage devices as well as additional FC switches) are not shown. In this example, FC switch 340 and FC core switch 330 are connected in ISL mode. FIG. 3 depicts three ports on both switches: one expansion port (E_port) and two trunking E ports (TE_ports).

In such a configuration, the FC switch 340 and the FC core switch 330 run FC protocols such as, for example, the Exchange Link Parameter (ELP) protocol and the Exchange Switch Capability (ESC) protocol, to establish communication between these switches via the physical link. The ELP protocol is an existing FC protocol that is used for communication with E ports. Similarly, the ESC protocol is an existing FC protocol that is used for communication between E ports. These protocols can be used to exchange information regarding the capabilities of switches.

Upon establishing the link between the switches, the FC core switch 330 may receive an ELP frame from FC switch 340. The ELP frame typically comprises various/different fields populated with the following information: Resource Allocation Time Out Value; Error Detect Time Out Value; World Wide Port Name; Switch name; receive data field size; and flow control parameters. The port manager 334 of FC core switch 330 is operative to retrieve a first identifier (e.g. the OUI) from the port WWN and send information to FC switch 340 acknowledging receipt of the ELP frame.

Then, the FC core switch 330 may receive an ESC request from FC switch 340. This ESC frame comprises a protocol frame including other information regarding the configuration of FC switch 340. This information may comprise the services/protocols that the connected port supports. For example, but not limited to, one field of the ESC request may comprise a vendor ID field populated with a character string identifying the manufacturer/vendor of the FC switch 340. The port manager 334 of FC core switch 330 is therefore operative to retrieve a second identifier (e.g. character string of the company name of the FC switch 340) from the vendor ID field.

In a situation where the port manager 334 of FC switch 330 does not found a match for the first identifier in a list of peer switch identifiers stored in memory 335, the second identifier may be retrieved and used. The list of peer switch identifiers may then be searched and if a match is found for the second identifier, the port manager 334 of FC core switch 330 determines that the FC switch 340 is a peer switch belonging to the same and/or an approved manufacturer. Although not described, those skilled in the art will appreciate that similar operations may be performed by the port manager 344 of FC switch 340.

Thereafter, the E-port trunking feature may be enabled between the TE_ports and/or the E-port channeling feature may be enabled between the E_ports of the FC core switch 330 and FC switch 340. In addition, the port manager 334 of FC core switch 330 is operative to update the list of peer switch identifiers by adding the first identifier to the list stored in memory 335. Similarly, port manager 344 of FC switch 340 is operative to update the list of peer switch identifiers stored in memory 345. Since the first identifier (e.g. OUI) has been added to the lists of peer switch identifiers, other applications running on the two FC switches 230 and 240 and making use of the first identifier may be enabled.

Figure 4:
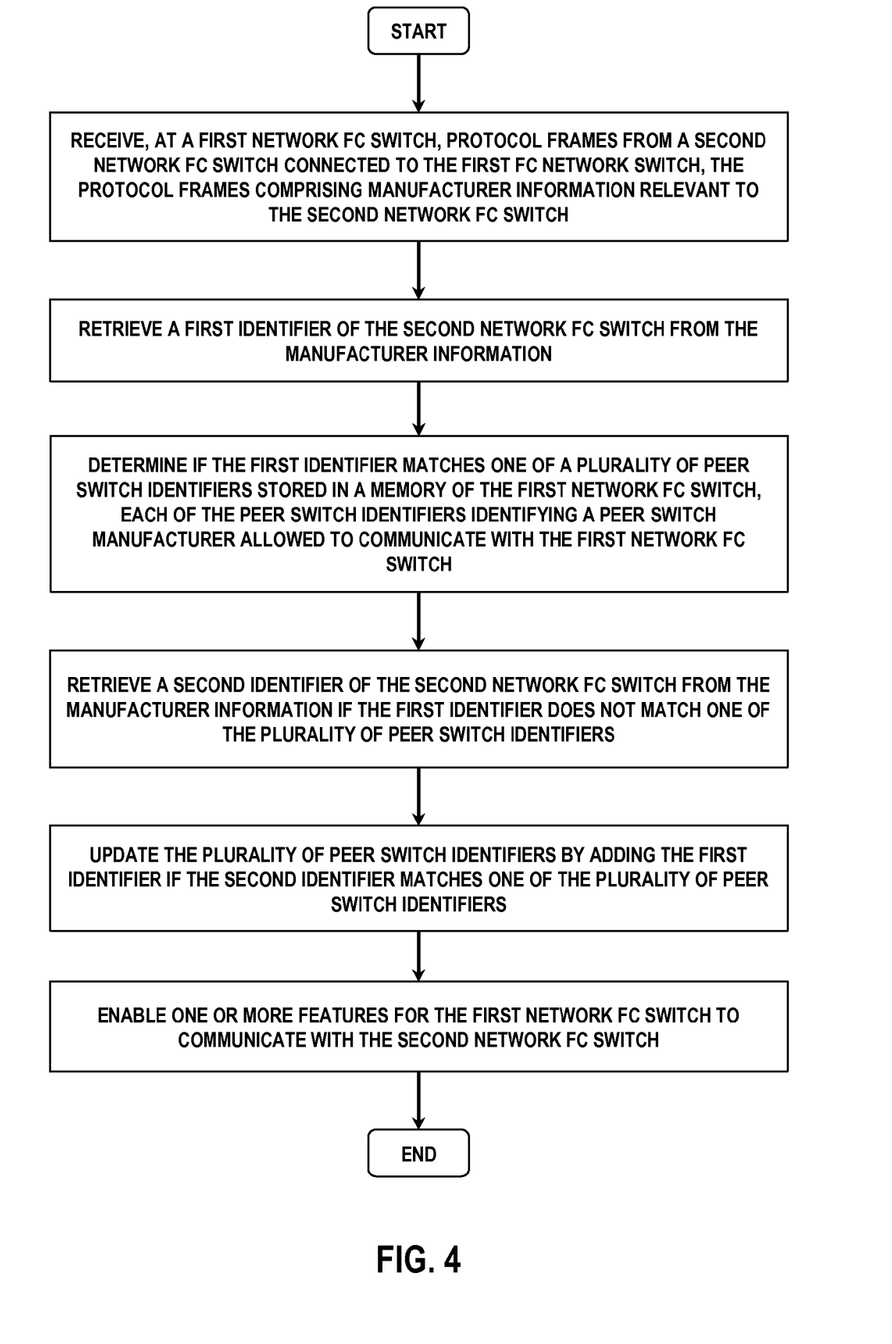
FIG. 4 is a simplified flow chart diagram illustrating a method for enabling communication between two network fiber channel (FC) switches in accordance with an embodiment of the present invention.

Reference is now made to FIG. 4, which is a simplified flow chart diagram illustrating a method for enabling communication between two FC switches in a storage area network in accordance with an embodiment of the present invention. FIG. 4 is believed to be self-explanatory in light of the above discussion.

As indicated hereinabove in relation to FIG. 1, the list of peer switch identifiers stored in memory, to which reference has been made in the description of FIGS. 2, 3 and 4, may be provided in any suitable form such as a list, a table, etc. Those skilled in the art will appreciate that a plurality of lists for the peer switch identifiers may be provided, stored in memory, searched and updated. For example, but without limiting the generality of the present invention, a first list of peer switch identifier may comprise a list of OUIs assigned to a particular manufacturer by the IEEE and a second list may comprise character strings representing company names of a particular manufacturer, including subsidiaries, affiliates and/or other company names approved by the manufacturer (e.g. Cisco, Andiamo, etc.). The first list may be searched to find a first identifier and the second list may be searched to find a second identifier in a situation where the first identifier was not found in the first list. In this example, when the second identifier is found in the second list, the first list may be updated to include the first identifier and then saved in memory.

Figure 5:
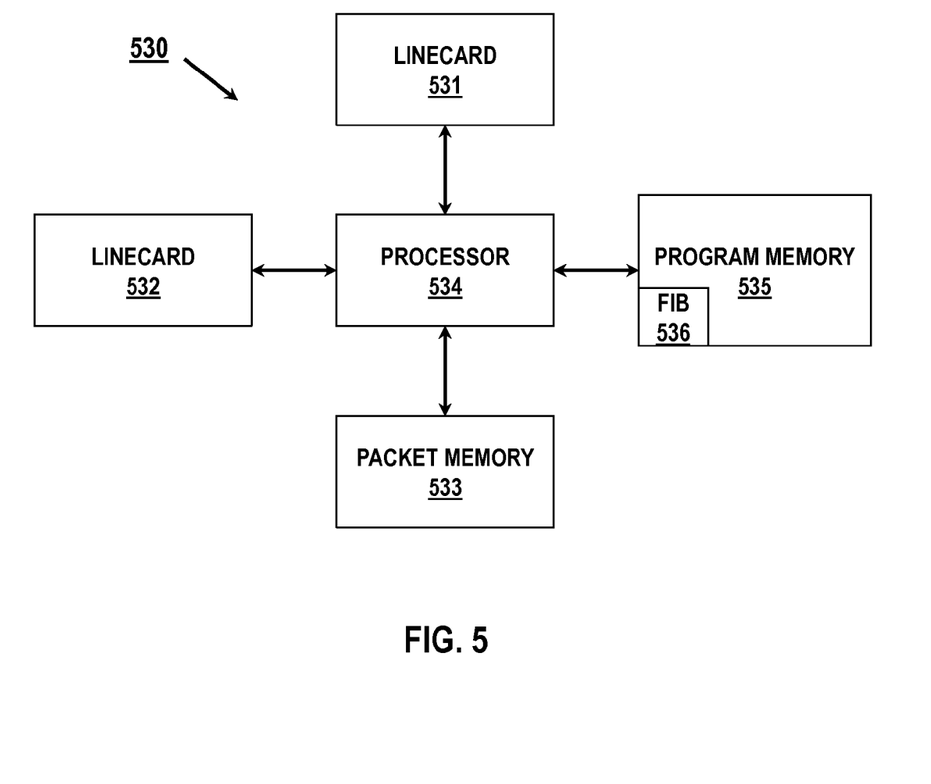
FIG. 5 is a block diagram illustration showing a network device constructed and operative for implementing embodiments described herein.

FIG. 5 depicts a network device 530, typically a network switch, which may be used to implement embodiments described herein. Network device 530 is configured to implement all of the network protocols and extensions thereof described herein. In one embodiment of the present invention, network device 530 is a programmable machine that may be implemented in hardware, software, or any combination thereof. Logic may be encoded in one or more tangible media for execution by a processor. For example, processor 534 may execute codes stored in a program memory 535. Program memory 535 is one example of a computer-readable medium. Program memory 535 can be a volatile memory. Another form of computer-readable medium storing the same codes is a type of non-volatile storage such as floppy disks, CD-ROMs, DVD-ROMs, hard disks, flash memory, etc. The memory 535 may include a forwarding table (e.g., FIB 536), fabric login table, FCID table, list of peer switch identifiers, etc.

Network device 530 interfaces with physical media via a plurality of linecards (network interfaces) 531-532. Linecards 531-532 may incorporate Ethernet interfaces, DSL interfaces, Gigabit Ethernet interfaces, 10-Gigabit Ethernet interfaces, SONET interfaces, etc. As packets are received, processed, and forwarded by network device 530, they may be stored in a packet memory 533. To implement functionality according to the system, linecards 531-532 may incorporate processing and memory resources similar to those discussed above in connection with the network device as a whole. It is to be understood that the network device 530 shown in FIG. 5 and described above is only one example and that different configurations of network devices may be used.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method for enabling communication and features between two network fiber channel (FC) switches, said method comprising:

receiving at least one protocol frame at a first network FC switch, said at least one protocol frame being received from a second network FC switch connected to said first network FC switch and comprising information related to a manufacturer of said second network FC switch;

retrieving a first identifier of said second network FC switch from said at least one protocol frame, said first identifier comprising primary manufacturer information identifying a manufacturer of said second network FC switch;

determining that said retrieved first identifier does not match one of a plurality of peer switch manufacturer identifiers stored in a memory of said first network FC switch, each of said plurality of peer switch manufacturer identifiers identifying peer switches for which one or more features may be enabled for communicating with said first network FC switch;

retrieving a second identifier of said second network FC switch from said at least one protocol frame when said retrieved first identifier does not match one of said plurality of peer switch manufacturer identifiers, said second identifier comprising secondary manufacturer information identifying said manufacturer of said second network FC switch; and upon determining that said retrieved second identifier matches one of said plurality of peer switch manufacturer identifiers, updating said plurality of peer switch manufacturer identifiers stored in memory of said first network FC switch to include said retrieved first identifier; and enabling at least one of said one or more features for said first network FC switch to communicate with said second network FC switch.

2. The method of claim 1, wherein said enabling comprises enabling F-port trunking and/or F-port channeling features between said first and second network FC switches.

3. The method of claim 1, wherein said enabling comprises enabling E-port trunking and/or E-port channeling features between said first and second network FC switches.

4. The method of claim 1, wherein said enabling comprises enabling port channeling between said first and second network FC switches.

5. The method of claim 1, wherein said receiving at least one protocol frame comprises receiving a fabric login (FLOGI) protocol frame.

6. The method of claim 1, wherein said receiving at least one protocol frame comprises receiving an Exchange Link Parameter (ELP) protocol frame.

7. The method of claim 5, wherein said retrieving a first identifier comprises retrieving an organizationally unique identifier (OUI) from said FLOGI protocol frame, said OUI being extracted from a worldwide name (WWN) present in a Node Port Name field and/or a Node Name field of the FLOGI protocol frame.

8. The method of claim 6, wherein said retrieving a first identifier comprises retrieving an organizationally unique identifier (OUI) from said ELP protocol frame, said OUI being extracted from a worldwide name (WWN) present in a World Wide Port Name field of a ELP protocol frame.

9. The method of claim 7, wherein said retrieving a second identifier comprises retrieving a character string identifying a manufacturer of said second network FC switch, said character string being extracted from a vendor identifier (vendor ID) field present in a Login Extension Data field of said FLOGI protocol frame.

10. The method of claim 8, wherein said receiving further comprises receiving an Exchange Switch Capabilities (ESC) protocol frame.

11. The method of claim 10, wherein said retrieving a second identifier comprises retrieving a character string identifying a manufacturer of said second network FC switch, said character string being extracted from a vendor ID field of said ESC protocol frame.

12. A network fiber channel (FC) switch, said network FC switch comprising:
at least one port operative to receive at least one protocol frame, said protocol frame being received from another network FC switch connected to said network FC switch, said at least one protocol frame comprising information relevant to a manufacturer of said other network FC switch;
a memory operative to store a plurality of peer switch manufacturer identifiers, each of said plurality of peer switch manufacturer identifiers identifying peer switches for which one or more features may be enabled for communicating with said network FC switch;
a processor operative to: retrieve a first identifier of said other network FC switch from said at least one protocol frame, said first identifier comprising primary manufacturer information identifying a manufacturer of said other network FC switch; determine that said retrieved first identifier does not match one of a plurality of peer switch manufacturer identifiers stored in said memory of said network FC switch; and retrieve a second identifier of said other network FC switch from said at least one protocol frame when said retrieved first identifier does not match one of said plurality of peer switch manufacturer identifiers, said second identifier comprising secondary manufacturer information identifying said manufacturer of said other network FC switch;
said processor being further operative to: update said plurality of peer switch manufacturer identifiers stored in memory of said network FC switch to include said retrieved first identifier; and enable at least one of said one or more features for said network FC switch to communicate with said other network FC switch upon determining that said retrieved second identifier matches one of said match one of said plurality of peer switch manufacturer identifiers.

13. The network FC switch of claim 12, wherein said network FC switch is a core switch set in Node Port Identifier Virtualization mode (NPIV).

14. The network switch of claim 12, wherein said network FC switch is connected to said other network FC switch via an inter-switch link (ISL).

15. The network FC switch of claim 13, wherein said other network FC switch connected to said network FC switch is set into Node Port Virtualization (NPV) mode.

16. The network FC switch of claim 12, wherein said at least one feature enabled between said network FC switch and said other network FC switch comprises E-port trunking.

17. The network FC switch of claim 12, wherein said at least one feature enabled between said network FC switch and said other network FC switch comprises E-port channeling.

18. The network FC switch of claim 12, wherein said at least one feature enabled between said network FC switch and said other network FC switch comprises F-port trunking.

19. The network FC switch of claim 12, wherein said at least one feature enabled between said network FC switch and said other network FC switch comprises F-port channeling.

20. One or more computer readable tangible storage media encoded with software comprising computer executable instructions and when the software is executed operative to:
receive at least one protocol frame at a first network FC switch, said at least one protocol frame being received from a second network FC switch connected to said first network FC switch and comprising information related to a manufacturer of said second network FC switch;
retrieve a first identifier of said second network FC switch from said at least one protocol frame, said first identifier comprising primary manufacturer information identifying a manufacturer of said second network FC switch;
determine that said retrieved first identifier does not match one of a plurality of peer switch manufacturer identifiers stored in a memory of said first network FC switch, each of said plurality of peer switch manufacturer identifiers identifying peer switches for which one or more features may be enabled for communicating with said first network FC switch;
retrieve a second identifier of said second network FC switch from said at least one protocol frame if said retrieved first identifier does not match one of said plurality of peer switch manufacturer identifiers, said second identifier comprising secondary manufacturer information identifying said manufacturer of said second network FC switch; and
upon determining that said retrieved second identifier matches one of said plurality of peer switch manufacturer identifiers,
update said plurality of peer switch manufacturer identifiers stored in memory of said first network FC switch to include said retrieved first identifier; and
enable at least one of said one or more features for said first network FC switch to communicate with said second network FC switch.

* * * * *

UNITED STATES PATENT AND TRADEMARK OFFICE
CERTIFICATE OF CORRECTION

| | |
|---|---|
| PATENT NO. | : 9,742,700 B2 |
| APPLICATION NO. | : 14/864062 |
| DATED | : August 22, 2017 |
| INVENTOR(S) | : Venkata Talagadadeevi et al. |

It is certified that error appears in the above-identified patent and that said Letters Patent is hereby corrected as shown below:

In the Claims

Column 9, Line 17, Claim 8, "of a" to read as --of the--.
Column 10, Line 6, Claim 14, "network switch" to read as --network FC switch--.
Column 10, Line 28 approx., Claim 20, "more computer" to read as --more non-transitory computer--.
Column 10, Line 28 approx., Claim 20, "readable tangible storage" to read as --readable storage--.

Signed and Sealed this
Third Day of October, 2017

Joseph Matal
*Performing the Functions and Duties of the*
*Under Secretary of Commerce for Intellectual Property and*
*Director of the United States Patent and Trademark Office*